United States Patent [19]
Lemelson

[11] Patent Number: 5,208,706
[45] Date of Patent: May 4, 1993

[54] MAGNETIC REPRODUCTION APPARATUS AND METHOD

[76] Inventor: Jerome H. Lemelson, 48 Parkside Dr., Princeton, N.J. 08540

[21] Appl. No.: 262,942

[22] Filed: Oct. 24, 1988

[51] Int. Cl.$^5$ .......................................... G11B 25/04
[52] U.S. Cl. ............................................ 360/2
[58] Field of Search ................... 360/2; 369/14, 100; 235/436, 440, 449, 485

[56] References Cited

U.S. PATENT DOCUMENTS

| | | | |
|---|---|---|---|
| 3,612,835 | 10/1971 | Andrews et al. | 235/449 |
| 3,818,500 | 6/1974 | Lemelson | 360/2 |
| 4,056,712 | 11/1977 | Trenkamp et al. | 235/440 |
| 4,213,163 | 7/1980 | Lemelson | 360/35.1 |
| 4,816,657 | 3/1989 | Stockburger et al. | 235/454 |

*Primary Examiner*—Donald McElheny, Jr.

[57] ABSTRACT

An apparatus and method for recording and reproducing data with respect to closely spaced magnetically recording areas or tracks of a magnetic recording member such as a card, tape or magnetic disc wherein scanning, tracking and reproduction functions are controlled by electro-optically scanning markers or indicia which are predeterminately recorded with respect to the magnetic recordings of the record member. Signals generated when such electro-optically scannable markers are detected are employed to control either or both the functions of selectively tracking and locating a magnetic transducer with respect to a select recording area or track of the magnetic record member and selectively controlling magnetic reproduction of information from the select recording area by either controlling the driving of the magnetic transducer mount and/or the operation of the transducer as it scans a select portion of the recording area or track along which it scans. In a particular method, the recording surface of the record member is preformed with track positional indicating indicia by molding or pressing, after which select magnetic data is recorded by control signals generated by electro-optically detecting such indicia, generating detection signals and employing same to control such recording of primary data. The invention also includes improvements in the structures of record members used with the apparatus and methods disclosed.

10 Claims, 6 Drawing Sheets

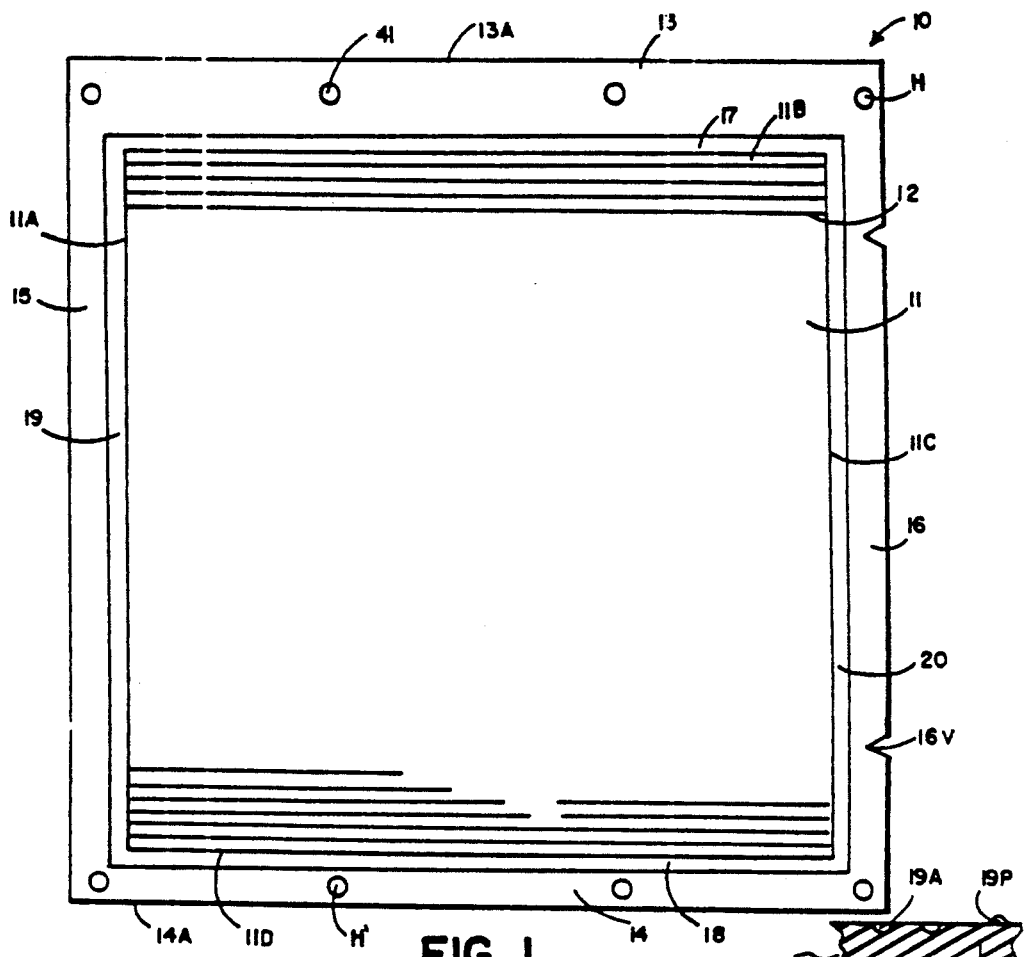
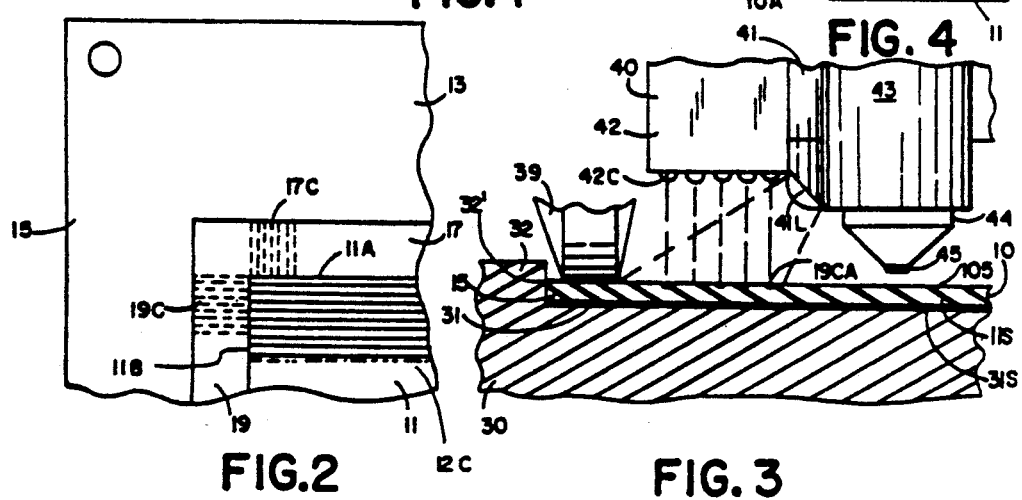

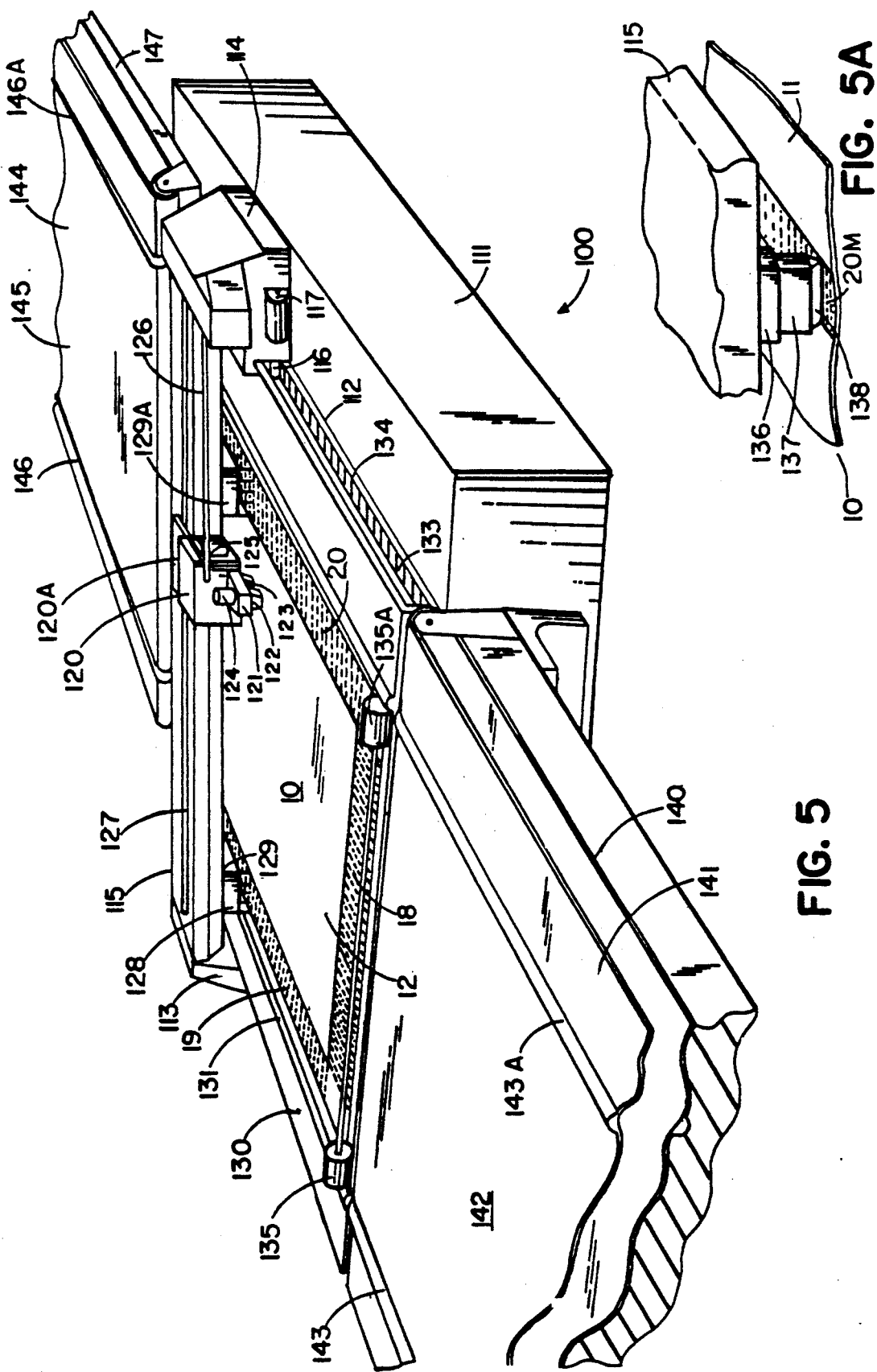

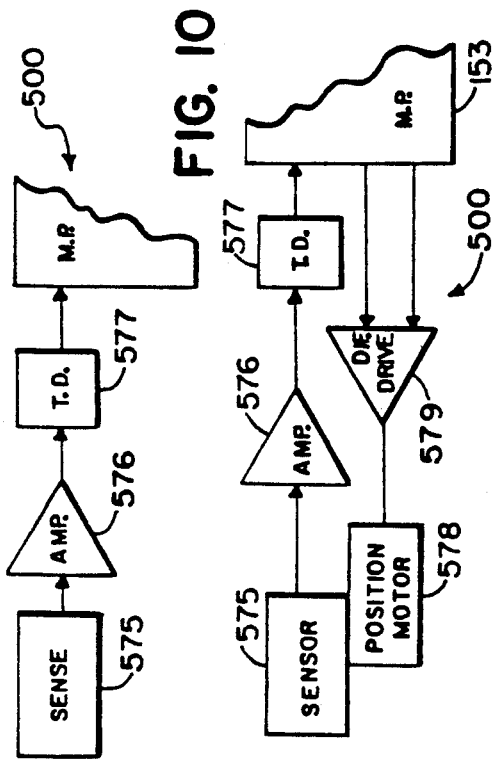
FIG. 10
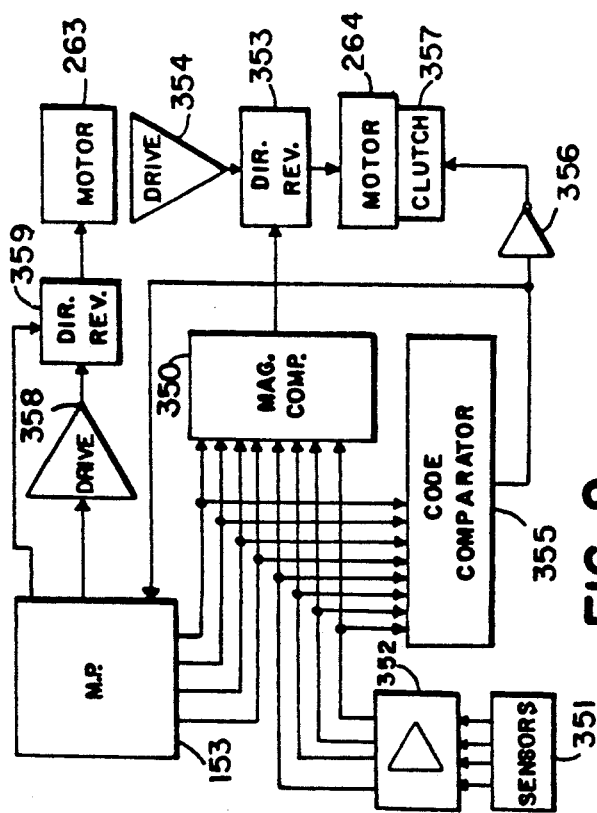
FIG. 9
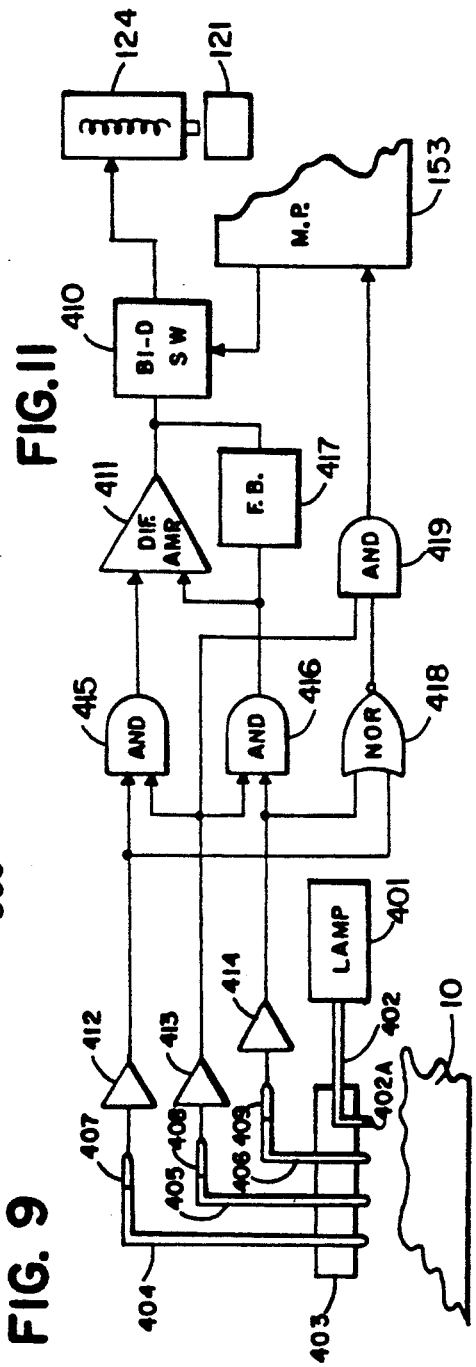
FIG. 11
FIG. 12

MAGNETIC REPRODUCTION APPARATUS AND METHOD

SUMMARY OF THE INVENTION

This invention relates to a high density data recording and reproduction system and method, and in particular to such an apparatus and method employing magnetic recording for primary data and electro-optically scannable recording of codes or markers indicative of the locations of respective frames or blocks of such primary data on the record member. As a result, conventional magnetic recording and reproduction transducers may be employed at low cost while high density electro-optical reproduction transducers may be employed to properly locate select magnetic recording areas for either selectively magnetically recording data thereon and/or selectively magnetically reproducing data therefrom.

It is known in the art to record data magnetically on magnetic recording members such as tape, discs, drums, cards or sheets of magnetic recording material by effecting proper relative scanning movement between one or more magnetic transducers and such magnetic recording material. It is also known to effect high density electro-optical recording on a record member by either utilizing a laser to scan and generate cavities or pits or to chemically change select minute portions of the record member or by utilizing a molding technique whereby pits or cavities defining code formations are rapidly and inexpensively impressed along select portions of one or more record tracks of a record member made of or containing a film of thermoplastic recording material which may be so molded. Both techniques have certain advantages and heretofor have been used separately to advantage but without utilizing the respective advantages of each technique.

The instant invention employs both electro-optically scannable recordings and magnetic recordings on a record member with an apparatus capable of at least scanning the electro-optical recordings and generating code and control signals therefrom and recording or reproducing magnetic recordings adjacent to the electro-optical recordings for selectively recording and obtaining data which is magnetically recorded by conventional low cost magnetic recording means. The use of electro-optically scannable recording for indicating the locations of select data which is magnetically recorded on a record member, has a number of advantages, a primary of which is that such recordings occupy substantially less space than conventional magnetic recordings of the same byte density and, in one instance, may be provided immediately over the magnetic recordings or immediately adjacent thereto so as to save a considerable amount of recording area. Furthermore, the electro-optically scannable indicia may be performed or otherwise recorded in the outer surface of the record member by molding or pressing same therein prior to effecting magnetic recordings of data which may be precisely recorded at select locations with respect to the performed optical recordings by electro-optically scanning the latter with electro-optical scanning means which is fixed next to the magnetic recording means and utilizing the signals generated by such indicia scanning to precisely locate the magnetically recorded data.

While the record members illustrated in the drawings are rectangular sheets or cards containing magnetic recording material with parallel record tracks which are closely spaced and extend parallel to lateral or longitudinal edges of the sheets or cards, they may comprise other magnetic recording members such as flexible magnetic tape, rigid or flexible (floppy) magnetic discs which define either closely spaced concentric magnetic record tracks or a closely spaced spiral magnetic track with one or more micro-depressions or cavities formed therein by molding or pressing their surfaces with a die or by means of machining with a laser beam. Such microdepressions may define single or multiple track and/or recording location indicia which may be scanned to generate signals for precisely locate the recording track or tracks containing select data recordings and/or select data recorded therealong. To further increase the density of recording and reduce the spacing between magnetic record tracks, a single track of indicia in the form of a single microchannel or a series of arrays of parallel code defining series bit codes may be formed along a single narrow track adjacent each magnetic track at a side thereof or directly thereabove to be electro-optically scanned and read while a magnetic head records on or reproduces from the magnetic track directly therebeneath or laterally displaced therefrom. Such microchannel or track containing electro-optically scannable recordings may also be provided along the spacing between parallel adjacent magnetic recording tracks as its width may be less than the width of the magnetic record tracks and the spacing required therebetween.

Accordingly it is a primary object of this invention to provide a new and improved apparatus and method for effecting high density data recordings on record members.

Another object is to provide a high density data recording system and method employing both electro-optical scanning means and magnetic recording and reproduction means to advantage.

Another object is to provide a high density recording and reproduction system and method in which frames or blocks of primary data are magnetically recorded and respective codes locating such frames and/or defining the contents thereof, are provided as high density electro-optically scannable recordings such as impressions, cavities or pits formed in a thin layer of thermoplastic recording material adjacent magnetic recording material.

Another object is to provide an apparatus and method for magnetically transducing information with respect to a magnetic record member which record member is predeterminately coded in a manner to define selected recording locations and selected information recorded thereon wherein such recordings are capable of being sensed or read without the engagement of a transducer or bank of transducers against the record member, thereby substantially reducing the wear and attrition to the record member.

Another object is to provide a method for selectively recording information on a magnetic record member by preforming the record member with a multitude of microcavities which define codes extending along selected portions of the record member, which codes are electro-optically scannable and may be utilized to precisely locate and effect the recording of information along selected tracks of the record member as well as the reproduction of selected information from selected tracks or selected portions of selected tracks of the record member.

Another object is to provide new and improved structures in record members, such as thin, flexible magnetic record cards, discs and tapes, which structures permit the high density recording of information on the record members and the selective reproduction of selected information from the high density recordings thereof.

Another object is to provide an apparatus and method for recording information on and reproducing such information from closely spaced, parallel record tracks of a thin, flexible magnetic recording card wherein such apparatus is relatively simple in structure and relatively easy to operate.

Another object is to provide an apparatus and method for precisely locating closely spaced record tracks of a record member such as a magnetic card both for the purposes of effecting magnetic recordings on selected tracks of the record member and selectively reproducing selected information from selected tracks thereof.

Another object is to provide a system and method for providing very high density magnetic recordings on a magnetic record member along closely spaced parallel tracks thereof wherein precision means of provided for aligning one or more transducers with selected tracks of the record members and for attaining alignment with selected recordings on such selected tracks without the need to attain contact of the transducers with the record member except when aligned with selected recordings thereon.

Another object is to provide a magnetic recording system and method for selectively recording and reproducing very high density recordings with respect to record members without the need to precisely locate the record members on a support for transducing relative thereto.

Another object is to provide a system and method for selectively reproducing information from selected tracks of a multiple track magnetic record member wherein electro-optical scanning means is first employed to control relative positioning of a reproduction transducer and the record member and magnetic transducing means is operable thereafter to effect the selective reproduction of information in the vicinity of location of the record member defined by electro-optically scannable recordings.

Another object is to provice a relatively low cost and simplified system and method for effecting high density magnetic recordings along closely spaced record tracks of a magnetic recoding member and for selectively reproducing selected of such high density recordings.

Another object is to provide a relatively low cost system and method for precisely aligning a magnetic record card and transducing means by scanning code recordings provided along opposite ends of the record member in alignment with selected tracks of the card.

With the above and such other objects in view as may hereinafter more fully appear, the invention consists of the novel constructions, combinations, arrangements of parts and methods as will hereinafter be more fully described and illustrated in the accompanying drawings, but it is to be understood that changes, variations and modifications may be resorted to which fall within the scope of the invention as claimed.

DESCRIPTION OF THE DRAWINGS

FIG. 1 is a plan view of a rectangular magnetic record card or sheet having both electro-optically scannable recordings for locating frames or groups of information recorded along tracks thereof and magnetic recordings of such track located information as well as means for aligning and retaining the card aligned on a support.

FIG. 2 is an enlarged view of a portion of the upper right hand corner of the record card of FIG. 1.

FIG. 3 is a partial view with parts broken away for clarity of a portion of the card of FIG. 1, a support therefor and a transducing apparatus.

FIG. 4 is an end view in cross section of a portion of a record card having micro-recordings molded or embossed in the surface stratum of the card as micro-cavities and micro-protrusions.

FIG. 5 is an isometric view of a first form of card transducing apparatus;

FIG. 5A is an isometric of a modified part of FIG. 5;

FIG. 9 is a schematic diagram of an electronic control system for controlling the operation of the apparatus of FIG. 6;

FIG. 10 is a schematic diagram of a code track transducing arrangement;

FIG. 11 shows a modified form of FIG. 10 and

FIG. 12 is a schematic diagram of a control system for controlling vertical movement of the transducer of FIGS. 1-6 during a transducing operation.

FIG. 1 illustrates one form of magnetic record member 10 in the shape of a rectangular or square record card having a central rectangular magnetic recording area 11 containing a multitude of closely spaced parallel record tracks 12. While the record tracks 12 may each contain information in the form of digital code signals, such as signals defining alpha-numeric characters such as words, phrases and sentences, such signals may also define pictorial and graphical information in digital or analog form. Notations 11A-11D denote the borders of area 11.

Figure 6:
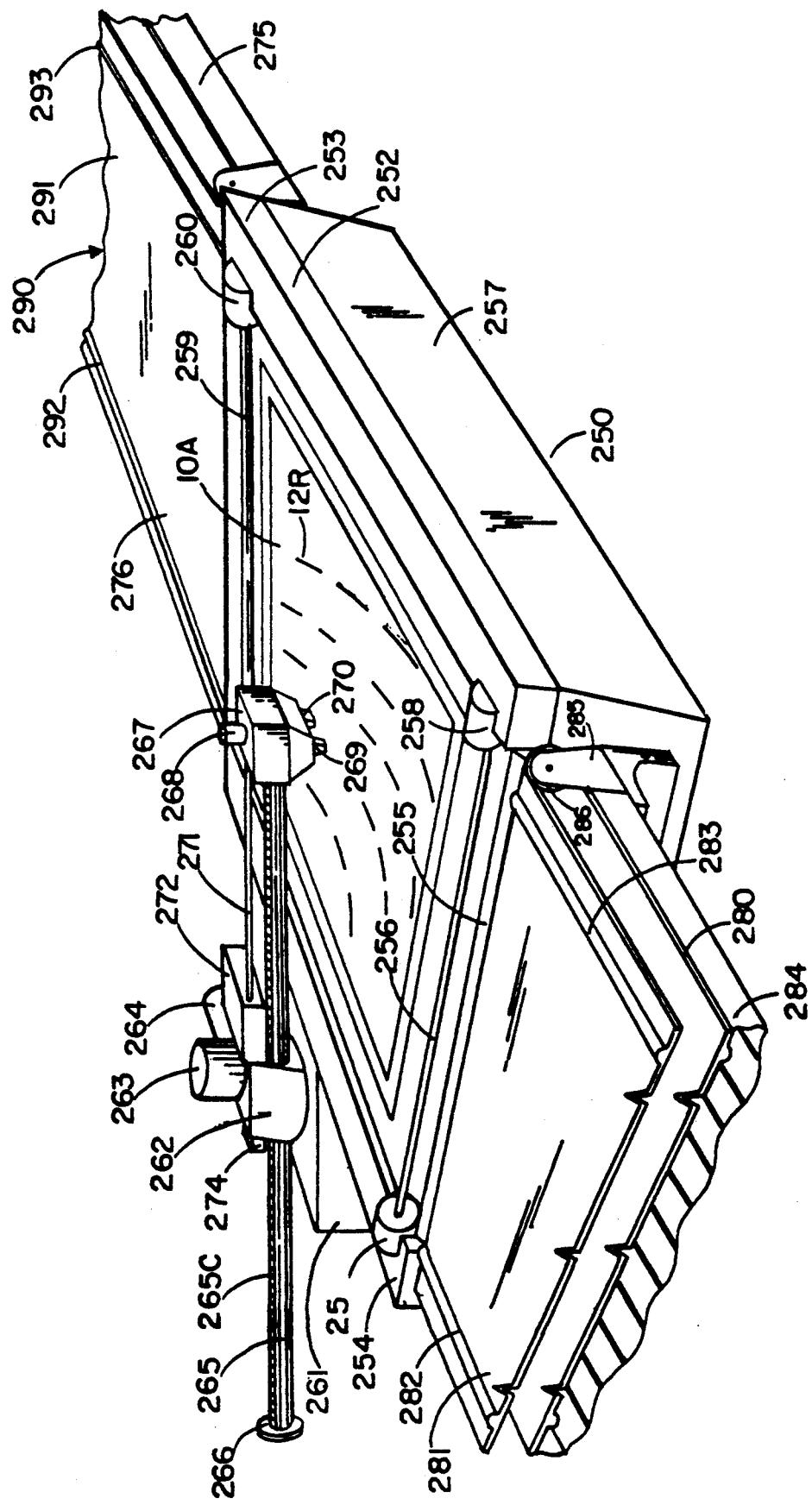
FIG. 6 is an ismoetric view of a modified form of card transducing apparatus.

The record member 10 may be one of a multitude of such record members which are supported in a stacked array by means of a suitable bin or rack support or may be stored within respective envelopes or jackets made of thin, flexible plastic sheet material and removable from their jackets either by means of an automatically operated device or manually.

The central recording portion 11 of the record member may contain a suitable magnetic recording material, such as chromium dioxide which may also extend across the entire surface of the record member permitting such record member to be produced from a coil formation of thin sheet or film stock material by die cutting same from the coil formation thereof, thereby providing a relatively inexpensive record medium.

Surrounding the central record portion 11 of the record member 10 is a rectangular strip area containing optically scannable marks or codes preferably embossed or molded along respcetive strip-like areas 17 and 18 which extend parallel to the record tracks 12 and define the lateral borders of the magnetic recording area 11 while parallelly extending strip-like areas 19 and 20 join the end portions of the strip-like areas 17 and 18.

Surrounding the strip-like areas 17, 18, 19 and 20 are respective border portions of the record member 10 denoted 13, 14, 15, and 16. Border portion 13 at the upper end of the record card 10 extends parallel to the parallely extending record tracks 12 of the central recording portion 11 while border portions 15 and 16 define front and rear ends of the record member and extend normal to the border portions 13 and 14 and the parallel record tracks of the central recording portion 11. Four holes H are formed in the corners of the record member 10 and may be utilized, together with additional holes extending along the border portions 15 and 16, to align the record member on a magnetic transducing device, such as a table, platen or a conveyor to simplify and permit the transducing of information with respect to the central magnetic recording area 11 of the record member 10. Additionally, as illustrated hereafter, any one or more of the edge portions of the rectangular record card 10 may be v-notched by die cutting indentations 16V which serve to permit the rapid alignment of the record card in a transducing device so that one or more magnetic transducers may be rapidly located with respect to one or more of the tracks 12 of the central portion 11 by driving the edge containing such V-notches into engagement with similarly shaped V-protrusions of a holding device, such as a drum or flat platen.

Further details of the magnetic record member 10 of FIG. 1 are illustrated in the partial enlarged view of FIG. 2. The strip-like portions 17 and 19 at the upper left hand corner of the central magnetic recording area 11 are shown each containing respective parallel bit codes 17C and 19C which preferably extend the entire length of the strip-like portions 17 and 19 and respectively define incremental portions or frames of each of the parallel record tracks 12 and the lateral locations of such record track. If the codes 17C and 19C are molded, punched or embosse along the strip-lile portions 17 and 19 of the record member 10, they may be utilized to automatically locate selected record tracks as well as longitudinal portions thereof and to control relative movement between one or more magnetic transducers and such tracks to permit the recording of information on or reproduction of information from such selected tracks or selected portions thereof in a control procedure which does not involve contact of a transducer or group of transducers against the surface of the record member during each recording or reproduction operation.

While the codes 17C and 19C, illustrated as extending along those portions of the code strip areas 17 and 19 which are adjacent the borders 11A and 11B of the central, rectangular, track containing recording area 11 of the card 10, and shown as parallel bit codes preferably formed of embossed micro-cavities or micro-protrusions, are shown as equi-spaced from each other in the longitudinal directions along their respective record strips, certain modifications may be effected in such code recordings disposed along the strip portions 17 and 19 of the record member. For example, while each of the codes 17C is illustrated as a parallel bit code which defines, for example, a particular coordinate or distance along the record strip 17 from the end or border 11A of the recording area 11, single marker pulse recordings may be disposed between spaced-apart parallel codes and may be counted therebetween during scanning as may similar bit recordings be interposed between parallel codes extending along areas 19–20 to indicate the locations of respective of the tracks 12. Also, since the entire surface of the record member 10 is preferably coated or made of magnetic recording material, such as chromium dioxide, code recordings may also be provided between or adjacent the parallel code recordings 17C and 19C of the code strip areas 17 and 19, which code recordings may be made after the record card 10 is formed, as described, by die cutting and embossing the parallel micro-cavities or protrusions therein defining the codes 17C and 19C. Such latter magnetic code recordings may be effected, for example, by one or more magnetic transducers supported by the same mount which supports the main transducer or transducers employed to record and reproduce primary information along the track 12 of the record member and may define, for example, codes which indicate the nature of the material recorded adjacent thereto so as to simplify or improve the automatic search and transducing functions associated with the main or primary information recorded along the record tracks 12.

In yet another form of the recording arrangement provided on the record member 10, it is noted that micro-embossings as a plurality of cavities 19A or protrusions 19P defining bit or parallel codes may also be provided at equi-spaced or selected locations of the recording area 11, such as at equal spacings along each of the record tracks 12 thereof or between each or a select number of such record tracks, so as to provide a means for searching and attaining selected recording areas of such record tracks for selectively magnetically recording frame or other information along selected portions of the record track by electro-optically scanning such topographic recordings with one or more electro-optical transducers supported by the mount supporting the main information recording transducer. It is also noted that frame or information location recordings may also be provided magnetically along portions of each of the record tracks 12 between adjacent portions thereof containing primary information to be derived by contact or operative coupling of the main magnetic reproduction transducer with the record member. Such magnetic code recording may be reproduced from the record tracks 12 after the main magnetic reproduction transducer or pickup has been properly located with respect to the selected track of the recording area 11 by scanning the code recordings provided along the code recording areas 17 and 19 as will be described hereafter, in order to effect a coarse prepositioning of the magnetic pickup with a portion of the record track immediately in advance of that portion of the record track containing the information desired to be reproduced therefrom. In other words, the code information existing, for example, along the record tracks 17 and 19 is first electro-optically scanned and the signals derived are employed, by means of suitable compatator electronic circuits, to effect relative prepositioning of the magnetic pickup with a selected record track and a portion thereof in advance of the selected portion of the track containing the information desired, whereafter the transducer is moved into operative engagement or coupling with the selected track whereafter it continues to move and reproduce recordings thereon including code recordings indicative of recorded information about to be scanned by the pickup during the continued relative movement, which latter code recordings may then be employed to control the selected reproduction of the desired information to the exclusion of other information recorded along the selected record track which the magnetic transducer is scanning.

Lateral border portions 15 and 16 of the rectangular magnetic recording sheet or card 10 are provided free of code or information recording and are sufficiently wide to permit engagement with drive and gripping means, such as drive wheels associated with the transducing device which supports the record card or sheet during a transducing operation. Border portion 13 at the top of the record card is preferably dimensioned and is sufficiently wide to permit movement of the record card by means of a suitable gripper or drive roll arrangement into and out of the storage device for the card, the transducing apparatus and, if employed, a jacket or envelope in which the card is stored to protect it from dust, dirt and handling damage.

Notation H refers to holes punched along the borders of the record sheet or card 10, which holes may be utilized to preposition and retain the card in storage as well as in the transducing apparatus which is operable to transduce recordings with respect to the record track 12 thereof and, in certain instances, with respect to the code recording tracks described. The holes H extending along the border portions 15 and 16 may be employed, for example, to effect controlled driving movement of the card by engagement therein of the teeth of respective drive sprocket wheels.

While scanning the code strip areas 17 and 19 may suffice to provide code signals indicative of the location of a magnetic transducer with respect to the card 10, additional code strips 18 and 20 are also provided which respectively extend parallel to the code strips 18 and 20 along opposite sides of the recording area 11. Such strips 18 and 20 may each contain the same parallel code recordings which extend respectively along the strips 17 and 19 with each similar code recording being directly aligned with a respective code recording of the opposite strip to serve as a means for checking alignment of the record card 10 with respect to the transport mechanism for the magnetic transducing head or heads operable to transduce primary information along the tracks 12. For example, if the magnetic transducing apparatus includes aligned banks of photoelectric detectors, including one bank operable to scan codes recorded on track 17 and the other for scanning codes recorded along track 18, suitable electronic logic circuitry, such as a plurality of AND gates may be employed for comparing each code signal as it is reproduced from one of the code strip areas with the code reproduced simultaneously therewith from the other strip area. If such codes match at a comparator electronic circuit to which they are passed, then it can readily be assumed that the card or record member 10 is properly aligned with respect to the transducing apparatus. If there is a variation in the code signals so produced and simultaneously applied to the comparator circuit, then it can be assumed that the parallel record tracks 12 and the record member 10 are not properly aligned in the transducing apparatus wherein such misalignment may be easily detected and employed to generate a control signal for preventing further operation of the transducing apparatus for warning the operator of such misalignment.

In FIG. 3 is shown a basic scanning arrangement relative to a record card 10 of the type illustrated in FIGS. 1 and 2, a portion of which is shown which includes the border portion 15, the code record portion or rectangular area 11 containing the parallel primary information record tracks 12. The apparatus includes a support or table 30 for record member 10 having a recess 31 formed in the upper surface thereof and shaped to properly support a rectangular record member 10 in lateral alignment within such recess after being fed thereto by a plurality of powered rollers, one of which is denoted 39 and is illustrated. Such plurality of rollers not only drives the record member 10 through the recess 31 but maintains it against the upper flat surface 31 S thereof in predetermined alignment to permit a movable support 41 forming part of the transducing apparatus 40, to properly move and carry the transducers adjacent the upper surface 10S of the record member 10 to permit the recording area 11 to be properly scanned in either the act of recording information along a selected portion thereof or reproducing information recorded on one or more selected portions thereof.

The movable support 41 includes a support for a bank 42 of photoelectric detectors 42C which are closely spaced and are operable to detect reflected light from the light source 41L which is supported by the support 41 immediately adjacent the housing for the photoelectric cell and is operable to project light against the upper surface of the record member 10 which is in alignment with the photoelectric cells 42C.

The code recording strip portion 19 of the record member 10 is illustrated as containing a plurality of cavities 19CA which define parallel codes, each of which is provided in alignment with a respective of the parallel record tracks 12 of the recording area 11, thereby defining the locations of the ends of such parallel record tracks. Supported adjacent the row or line of photoelectric detectors 42C and in predetermined alignment therewith, is a magnetic recording transducer 44 which is movable from a retracted position, as illustrated, to a projected position whereby its operating end 45 either operatively engages a select portion of a selected record track 12 or is disposed immediately adjacent thereto at a distance to permit it to thereafter reproduce the code signal extending along the selected record track and immediately adjacent the selected portion of the record member. The magnetic transducer 44 is thus slidably or otherwise movably supported on its housing 43 and may be projected into operative engagement or location with respect to the upper surface 10S of the record member 10 by means of a solenoid, air operated piston or other suitable means controlled by a microprocessor or computer receiving the code signals output by cells 42C.

In another form of scanning, each of the photoelectric detectors 42C of the bank 42 thereof may contain its own miniature light source, such as a solid state laser supported at the center of the photodetector and operable to transmit a narrow beam of light, parallel to the beams of the other cells 42C so as to intersect a particular code record track of the code recording strip area 19 and to provide variations in the light received by the respective photoelectric cell when intersecting the cavities or protrusions in CA provided along the code strip 19. In FIG. 3 a single light source 41C illuminates the code strips and the code defining formations or cavities thereof to provide reflected light for the cells 42C which light is diffused when the code formations 19C come into alignment with respective of the cells and may therefore be used to detect the code by varying the light received by the cells each time a parallel code recording is aligned with and scanned by the bank of cells.

While the record card 10 illustrated in FIGS. 1-3 may be made of any suitable plastic or metal, in a preferred form of the invention it is made of a polyester plastic base, such as Mylar, coated with a suitable magnetic recording material such as chromium dioxide. Preferred dimensions of a typical record card and the recordings thereon are noted as follows:

(a) overall card dimensions—8"×8".
(b) border strip areas 13-16 are between ¼" to 1" wide.
(c) Code strip areas 17-19 are between ¼"×¼" wide.
(d) Thickness of sheet or card—0.001".

Hole punchings H may extend completely along the lateral borders of the card or at the four corners of the card as illustrated and either or both the leading and trailing edges may be V-notched for centering and locating the card with respect to a flat or cylindrically shaped supporting surface to permit proper transducing by means of a bridge crane supported transducer or array of such transducers or a pivotted and lineally movable arm supporting such transducer.

The code containing strip areas 17, 18, 19 and 20 preferably contains such parallel codes embossed in the surface stratum of the record card along such areas by means of a precision heated die although such code recordings may also be recorded by injection molding same or the action of a laser, the beam or beams of which are intensity modulated and deflection controlled by signals generated by a computer as controlled relative movement is effected between the beam or beams and the record card in the desired direction or directions to effect the parallel code recording along the code recording strip areas of the card. Utilizing such a thin sheet of card recording material, a plurality of such sheets may be stacked one above the other and aligned such that, when intense radiation beam or group of such beams generated by one or more lasers are caused to intersect the outermost card, it will penetrate and effect recordings of similar nature along the plurality of cards or sheets disposed immediately adjacent thereto by penetrating each of such sheets with the exception of the last sheet to be recorded on. Such penetrations or holes may be spaced apart and configured as to define the described electro-optically readable code recordings along the code tracks 19 and 20 in alignment with respective of the primary information record tracks 12 and on the lateral tracks 17 and 18 aligned with frame and/or coordinate locations of the magnetic recording area 11 of the card of FIG. 1.

As indicated above, micro-cavities may be formed in a master die or mold by means of a pulsed laser beam modulated with suitable coded electrical signals defining the track and coordinate or frame locations of the record member 10 which beam may form microscopic cavities or pits which are a fraction to several microns or more in width and 0.2 to 1.0 microns or more in depth wherein the spacings between micro-cavities and/or the lengths thereof define the code recordings as digital binary codes which are machine readable by photodetection means detecting reflected or laser light and its diffusion by the micro-cavities to generate coded electrical signals which may be computer or comparator analyzed and employed for control purposes as described. If the code track strips 17-20 are ¼" to ¼" wide, the parallel codes recorded across the width thereof may be composed of pits, cavities and/or protrusions which are spaced substantial distances apart compared to their individual widths to permit them to be scanned by respective of the photodetectors of the bank of detectors 42C each of which detectors is positioned to scan a respective width or track of the track strips 17-20. When the mold or die so formed is used for injection molding a plastic record card or portion thereof or to emboss cavities or protrusions in sheet or card stock of magnetic recording material it will form such strip-like areas with respective arrays of parallel electro-optically scannable codes equispaced or otherwise provided adjacent the central magnetic recording area 11 of the card.

In FIG. 4 is shown a modified form of the magnetic record member described denoted 10A and having a code record track or rectangular strip area, the code recordings along which are defined by both micro-cavities 19 A and micro-protursions 19P or either of such formations defining by their spacings and/or lengths parallel binary code recordings which may be electro-optically scanned as described and employed to locate grid or coordinate locations of the recording area 11 of the card including the locations of respective of the tracks 12 thereof.

If the entire record member 10 is coated with a magnetic recording material, then the recording areas 17-20 containing the described topographical variations may also contain magnetic recordings of codes which may be prerecorded and/or recorded when or after the record tracks 12 are recorded with primary information, wherein such magnetic code recordings may define cross referencing information for finding selected primary information recorded on the card or may also define codes for effecting fine control of the movement of the transducer mount in attaining predetermined location of the transducer thereof with respect to a selected track and selected information recorded thereon.

In another form of the recording arrangement described, such micro-cavities and/or protrusions defining parallel codes may be embossed or molded along selected of the tracks 12, adjacent selected of such tracks or at selected frame locations of each of the tracks to be scanned as described and used to properly locate the magnetic transducer(s) for recording and/or reproducing selected information along selected portions of selected tracks of the card.

The scanning assembly of the type illustrated in FIG. 3 may be supported for movement across the upper surface of the table or base 30 while the record member 10 is secured flat against such flat surface between a plurality of side guides for the edges of the card shaped record member, one of which guides 32 is shown having an inner surface extending parallel to a similar surface across the table for aligning the parallel straight edges 15A and 16A of the card on the table top while the powered rollers 39 maintain the card flat against the upper surface 31S of the table 31. Solenoid operated fingers or grippers supported at the sides of the central portion of the table 31 containing the surface 31S may also be used to hold the card or sheet 10 flat against surface 31S. The lateral edges 13A and 14A of the sheet 10 may also be aligned on surface 31A by means of stops or bars which are operable to automatically project and retract with respect to the surface 31S to engage either or both edges 13A and 14A of the card or sheet.

The support for the transducing assembly 40 may comprise a bridge-crane type of mount supported at its ends by wheeled or sliding carriages travelling respective parallel rails or guides supported at the sides of the rectangular table or its support while the transducer head assembly which is illustraed in FIG. 3 may be movable back and forth across the guideway or track of the bridge which is supported by said carriages above the upper surface 31S of the table 31. Reversible, controlled gear motors may be employed to power drive the bridge back and forth across the table and to power drive the transducer assembly back and forth across the bridge track at high speed with the head 44 retracted until signals generated by the photodetectors 42C of the bank 42 indicate that the transducer head end 45 is in alignment with a selected track or selected portion of a selected track of the card after which the solenoid or motor driving the transducer causes it to engage the upper surface of the card to transduce the selected recording therefrom until it is automatically retracted upon completion of the selected scanning operation.

The transducing assembly 40 may also be supported for selective movement across the upper surface 31S of the table on a pivoted mount supporting an elongated arm or assembly on which the assembly 40 is supported to permit the attainment of polar coordinate locations of the record card by the controlled rotation of the arm and its end assembly 40 and the controlled back and forth movement of the arm assembly with respect to the pivoted mount employing controlled reversible gear motors and/or inch worm motors for such movements.

If the card is disposed slightly skewed on the table top surface 31S such skew may be indicated by processing the signals generated by means of banks of electro-optical transducers such as 42C located in direct alignment with each other at opposite ends of the bridge supporting the transducer head assembly and adapted to simultaneously scan the parallel codes extending along the code strip areas 19 and 20. The degree of such skew may be electronically detected and determined by substracting or adding the numerical values of the codes which are simultaneously generated by such electro-optical detectors scanning the strip areas 19 and 20. The difference signals my be employed to effect correction of the skew condition so that the transducer or transducers scanning the selected track of the card may effect such scanning if the skew condition is such as to cause the transducer assembly to travel at an angle to the selected track wherein the operating end of the transducer travels off the track before the end of the recording or recording portion of the track is scanned thereby. Such correction may be effected by using such difference signals to automatically control operation of one or more motors which drive one or more of the table 31, card 10 or mount 40 through an angle necessary to align the transducer mount or transport with the parallel tracks of the card or record member.

In FIG. 5 is shown further details of a first form of record card support and transducer transport applicable for receiving and prepositioning a record card of the type illustrated in FIGS. 1 and 2 with a flat surface thereof and for guiding a transducer in movement to and along a select track of the parallel tracks 12 and transducing with respect to either a select portion of such selected track or a selected recording provided as one of a number of recordings along the selected track. The transducer transport is of the bridge crane type.

The transducing apparatus 100 includes a support 111 in the form of a rectangular housing or solid block of metal or stone such as granite supporting a table 112 which is preferably a rigid housing or solid plate of metal having formed along its lateral border portions respective linear indentations, one of which is illustrated and denoted 133. Each of the indentations contains a toothed track or rack 133 such as a fine toothed spur gear secured to one of the walls of the indentation. The toothed rack 134 illustrated in FIG. 5 is secured to the bottom wall of the elongated opening 133 in the lateral edge of the table 112. A similar fine spur gear or rack is secured to the bottom wall of a slotted opening formed in the opposite lateral wall of table 112 and the teeth of the two racks are engaged by respective toothed wheels or pinions supported by respective verticals of a bridge supporting the transducer assembly for lineal movement along such bridge. Notations 113 and 114 define such vertical supports for a lateral guideway 115 secured therebetween for guiding a carriage 120 containing a plurality of transducers 122 and 123 adapted to scan recordings provided along the parallel tracks 12 of a record member 10 which is centrally disposed on the upper surface 130 of the table 112. A single gear motor 117 is supported by the vertical support 114 and is connected through suitable gears and shafting to drive the two wheels or spur gears which ride in the toothed racks, one of such spur gears 116 being illustrated as adapted to have its teeth ride in rack 134 supported to the bottom wall of the slotted opening 133 in the side wall of the table 130. The other toothed wheel which is supported by the vertical support 113 at the other side of the table may be connected to the output shaft of the gear motor 117 by means of suitable gears and shafts extending to the interiors of the housings defining the verticals 113 and 114 and the lateral column or trackway 115 joining the vertical housings 113 and 114 together. Suitable ball or roller bearing supported wheels may be supported for rotation by the housings 113 and 114 to permit rolling movement of the assembly supported thereby along the upper surfaces of the main housing 111 or suitable ways or tracks supported thereby and extending parallel to the lateral sides of the table 112.

The transducer carriage assembly 120 supports a mount 121 for a plurality of location sensing transducers 122 and one or more primary information recording and reproduction transducers denoted 123. If the location sensors 122 are photoelectric detectors of the type provided, for example, in the scanning arrangement illustrated in FIG. 3 a single bi-stable actuator motor or solenoid 124 supported by the mount 121 may be utilized to project and retract the transducer or transducers 123 into and out of engagement with the selected track of a record member supported on the upper surface 130 of the table 112 to permit such transducer or transducers to scan the selected track at least along a selected portion thereof. If the transducers defining the bank 122 are magnetic pickups adapted to sense magnetic recordings of coordinate locating codes disposed along the described border code strip areas 17 and 18 or along the tracks 12 of the magnetic recording portion 11 of the record card, then either the same bi-stable actuator or solenoid 124 or an auxiliary solenoid supported adjacent thereto, may be employed to advance the parallel code reading transducers 122 into engagement with the surface of the magnetic record member supported on the upper surface 130 of the table and to retract same therefrom immediately after the selected recording or selected portion of the selected track has been transduced.

A reversible gear motor 125 is shown supported by the carriage 120A and has its output shaft [not shown] coupled to a toothed wheel which is adapted to engage a toothed rack [not shown] similar to the rack 134 and supported within a slotted opening 127 formed in the top wall of the lateral guideway 115 for receiving the spurgear drive wheel connected to the output shaft of the reversible motor 125 and for effecting lateral wheeled or sliding movement of the carriage 120 back and forth along the lateral guideway 115. Also illustrated is a flexible cable 126 containing wires which connect the transducers 122, 123, the solenoid or actuator 124 and the motor 125 with external controls and power supplies. Such cable 126 may be connected to a self winding fixture supported within the vertical housing 114 to maintain it taut at all times as the carriage 120 moves back and forth along the guideway 115. An extension 120A of the carriage 120 supports the shaft geared to the output shaft of motor 125 and, at its other end, to a second shaft [not shown] to which the described spurgear is secured for engaging the teeth of the rack located within the lateral guide 115 and driving the carriage 120 back and forth along 115.

Supported along the bottom wall of the lateral guideway 115 near the ends thereof are respective banks of transducers denoted 128 and 129, the transducers of which may comprise photoelectric detectors of the type provided in FIG. 3 for scanning code defining microcavities formed in the parallel code strip portions 19 and 20 of a record card disposed against the upper surface 130A of the table 130. If the code strip areas 19 and 20 of the record card contain magnetic recordings of such coordinate and track locating codes, the transducers defining the banks 128 and 129 may either be spring mounted and adapted to engage respective tracks of the code strip areas 19 and 20 whenever the record card 10 is disposed beneath the bridge supporting the transducer carriage 120. Alternatively, the transducers defining the banks 128 and 129 thereof may also be supported for movement on respective mounts and operatively move into engagement with respective of the parallel code track strip areas 19 and 20 by means of respective bi-stable solenoids or activators which are fixedly supported on mounts adjacent to the bottom wall of the lateral guideway assembly 115.

Illustrated as supported in alignment with respective ends of the table 112 are respective conveyor assemblies 140 and 144, each operable to respectively feed a record card to one end of the table 112 and to receive a record card fed from such table after a transducing operation with respect to the recordings of the record card. Conveyor 140 is supported by a frame or table 140A and comprises an endless belt 141 having a central portion 142 and a pair of raised parallel ribs 143 and 143A between which a record is disposed by manual or machine means against the upper surface of the central portion 142. The conveyor belt is driven by a suitable motor to drive a record card disposed against the central portion 142 thereof beneath drive rolls or wheels 135 and 135A which are rotationally supported at the end of the table 112 and power rotated against the border portions of the record card and operable to drive such record card to a transducing location as illustrated in FIG. 5. Once the record card is so located against the upper surface 130 of the table 112 with the far end of the record card 10 engaged between rollers [not shown] similar to rollers 135 and 135A at the far end of the record table, an automatic transducing operation may be effected, as described, by driving the bridge assembly including the lateral guideway 115 along the guides therefor causing the code sensing transducers of the banks 128 and 129 to sense the track locating codes recorded along the strip areas 19 and 20 of the record card until a selected track of the card has been sensed or a code located a predetermined distance from such selected card is sensed whereupon a control signal is generated which causes the bridge assembly to stop with the transducers 122 and 123 in alignment with a selected track of the recording area 11 of the card. If the code recordings on or adjacent the selected track of the card are magnetic recordings, a single code scanning transducer 122 is projected against the track by means of the solenoid 124 together with the primary information reproduction transducer 123 or by means of an auxiliary solenoid if it is desired to maintain the transducer 123 out of engagement with the selected record track until a selected portion or recording thereon has been reached by the controlled movement of the carriage 120 along the selected track. If location defining or frame defining recordings are provided as series codes along selected portions of each of the tracks, then a single reproduction transducer 123 may be employed to reproduce both such latter recordings and primary information such as document or frame recordings disposed between such code recordings and may be adapted to engage the selected track of the record member during movement of the carriage 120 in the direction of such selected track.

The code recording strips 17 and 18 may also be scanned by the transducer or transducers supported by the carriage 120 when the bridge supporting the guideway 115 is properly located over or adjacent to such latter code strip recordings areas so as to predeterminately locate the carriage 120 in longitudinal alignment with a selected frame of information existing along a selected of the tracks 12 located a distance therefrom but attainable when the bridge assembly is driven in the direction of such selected track and the parallel code sensing transducers of the banks 128 and 129 thereof sense the track locating and indicating codes recorded along the code strip portions 19 and 20 of the record member 10.

If a computer is utilized which is programmed to track and always determine the location of the carriage and transducer 123 with respect to a record member aligned on and supported against the upper surface 130 of the table 112, such computer may be utilized to control the operation of the motors 117 and 125 to properly drive the bridge and the carriage 120 from any location along their respective guideways to a selected location whereby the primary information transducer 123 is positioned for transducing with respect to a selected portion of a selected track of the record card and is drivable thereafter in the direction of the selected track and along a portion thereof containing selected information or adapted to receive and have recorded thereon externally generated selected information.

The guides 143 and 143A as well as similar guides 146 and 146A secured respectively to the endless belt 141 and 145 of the in-feed and outgoing conveyors 140 and 144 are preferably strip-like formations of said belts or strips secured thereto which extend parallel to each other and are spaced apart the width of a card to provide alignment of the card between such strip-like formations. If such card alignment is attained when the card is fed to the upper surface 130 of the table 112 and is attained during driving movement of the card along such upper surface, then, if the guideway 115 is properly aligned across the table 112, the carriage will be driven in a path to cause the transducer or transducers supported thereby to scan parallel to the parallel tracks 12 of the card. If such alignment is not attained and misalignment occurs, it will be necessary to realign the card on the upper surface 130 between the guides 131 and 132 by means of a suitable power operated device which frictionally or by means of suction, engages either the bottom surface or upper surface of the card and properly moves same in a manner to correct for such skew or by power rotating the central portion of the table mounting and supporting the card with respect to the main portion thereof by means of a controlled motor which receives control signals from a computer which processes the code signals generated by the banks 128 and 129 of sensors which scan and sense the codes of the code strip areas 19 and 20 of the card disposed on the table.

Illustrated in FIG. 5A is a modified form of scanning device 136 supported by the lateral guideway or bridge 115, which device 136 contains a bank 137 of magnetic pick-up transducers 138 adapted to scan a code strip area 20M by sliding contact therewith to detect parallel bit binary codes recorded therealong as magnetic recordings of data defining respective tracks of the parallel record tracks of the card 10 aligned on the table 112. A similar bank of magnetic transducers may also be supported by the carriage 120A of FIG. 5 and projectable therefrom from a retracted position into engagement with one of the parallel code tracks extending normal to code strip or track 20M, equivalent for example to tracks 17 and 18 of FIG. 1, to position the primary information transducer or transducers 123 in alignment with selected frames of the selected parallel tracks to be scanned and to selectively reproduce frame signals or record such signals alongs such selected frame locations.

It is noted that such magnetic transducing means for sensing magnetic codes defining track and frame locations may be operable to sense magnetic codes defined by signals magnetically recorded along the strip areas equivalent to areas 17-20 of FIG. 1 or recordings defined by embossed cavities or protrusions formed when the record member is first formed which cavities or protrusions define parallel codes or marks which are magnetically detectable by transducing as a result of magnetic variations they effect in the magnetic field defined by magnetizing the strip areas 17-20 with a constant magnetic field which is locally varied in intensity to the scanning reproduction transducers by the pits and/or cavities.

FIG. 6 illustrates a support and transducing assembly for scanning magnetic record members of the type illustrated in FIG. 1-3 but containing parallel record tracks which are circular in configuration and extend across the central portion of the record card inwardly of the rectangular frame defined by the parallel code strips, such as code strips 17-20 of FIG. 1, which circumscribe the central recording area.

The apparatus 250 includes an upper table 252 supported on a mount 257 which also supports the ends of an in-feed conveyor 280 and an outgoing conveyor 290 which respectively operates to feed rectangular record cards to the central portion 252A of the table which is bordered by raised lateral portions 253 and 254 having inner walls which are space-separated from each other the width of a record card 10A fed thereto.

The conveyor belt 281 of the in-feed conveyor 280 is shown having its lateral edge portions containing raised formations which are space-separated from each other the width of a card and which serve to properly align a record card thereon and to feed such record card in alignment with and between a plurality of powered rollers, two of which 257 and 258 are illustrated in FIG. 6 and are connected by means of a shaft 256. The space between the end of the belt conveyor 280 and the end of the table 252 preferably contains a plate 255 which is properly shaped and disposed to guide the record card between powered rollers 257 and 258 and a third larger powered roller may be employed at the center of the shaft 256 to first receive and drive the record card from the belt 281 to the upper surface of the central portion of the table 252 and continue to drive such card until it is centrally disposed against such upper surface as illustrated, and engaged by a plurality of powered rolls, one of which 260 is illustrated and is rotationally supported on a shaft 259 at the other end of the table. By properly driving the card beneath such powered roll and controlling the motors rotating same, a card may be engaged thereby and maintained in a flat, slightly taut condition against the upper surface of the central portion of the table 252. Once such alignment and positioning of the card has been attained, a transducer head assembly 267 containing one or more transducers 269 and supported at the end of a precision ground elongated shaft or track 265, is driven thereon into alignment with a selected circular record track of the card disposed along the central portion thereof. The elongated shaft 265 is slidably supported to be driven through a lineal bearing supported within a housing 262, which housing is pivotally supported on a mount 261 which is supported against the side wall of the main support 257. Such housing 262 and the shaft 265 supported thereby is controllably rotated about a pivot by means of a suitable reversible gear motor 263 supported thereby. A solenoid or lineal actuator 268 supported by the mount 267 for the transducer 269 operates to project a retracted transducer into engagement with the upper surface of a card 10A when the shaft 265 has been selectively extended to position the transducer 269 in alignment with a selected circular track of the card. Once the transducer 269 has been so projected, the motor 263 may be automatically controlled to operate and pivot the housing 262 and the shaft 265 in an arc permitting the transducer to scan a selected track of the card. If a precision resolver or angle indicator is operable to generate signals indicative of the degree of rotation of the housing 262 on its mount, and such signals are fed to a computer, the computer may generate a control signal for both controlling the solenoid 268 to project the transducer 269 from the mount 267 into engagement with a selected portion of the selected track of the card to maintain such engagement to permit information to be recorded along such selected track portion or reproduced therefrom until the selected track portion has been completely scanned by such transducer, after which the transducer may be automatically retracted off the track.

The apparatus illustrated in FIG. 6 may be operated by precisely aligning the record card containing circular record tracks precisely located on the card, on the upper surface of the central portion of the table 252 and generating signals by scanning suitable marks or gratings extending along the shaft 265 and by scanning a circular array of recordings or gratings provided on the scanning disc of a precision resolver which is power rotated or has scanning transducers rotated by the motor 263 so as to generate signals defining the polar coordinates of the location of the shaft 265.

If the record card 10A contains a series of circular magnetic record tracks which extend parallel to each other across the recording area of the card, each of the tracks may have recorded thereon series code recordings between primary information recordings, which code recordings may be detected by the same transducer 269 which scans and detects the primary information recordings and may be utilized to generate electrical code signals which are analyzed by the computer controlling the scanning operation for controlling the degree of rotation of the shaft 265 and the operation of solenoid 268 to project the transducer 269 against the selected track or to project a code scanning transducer adjacent thereto against a code containing track adjacent thereto.

Also illustrated in FIG. 6 is a flexible cable 271 containing wires extending to one or more of the transducers supported by the transducing head mount 267 and to the solenoid 268 for properly powering and controlling same. The cable 271 extends to a self winding retainer 272 supported by the housing 262 to maintain such cable taut at all times as the shaft 265 is driven in either direction. A stop 266 at the end of shaft 265 limits its travel through housing 262.

Figure 7:
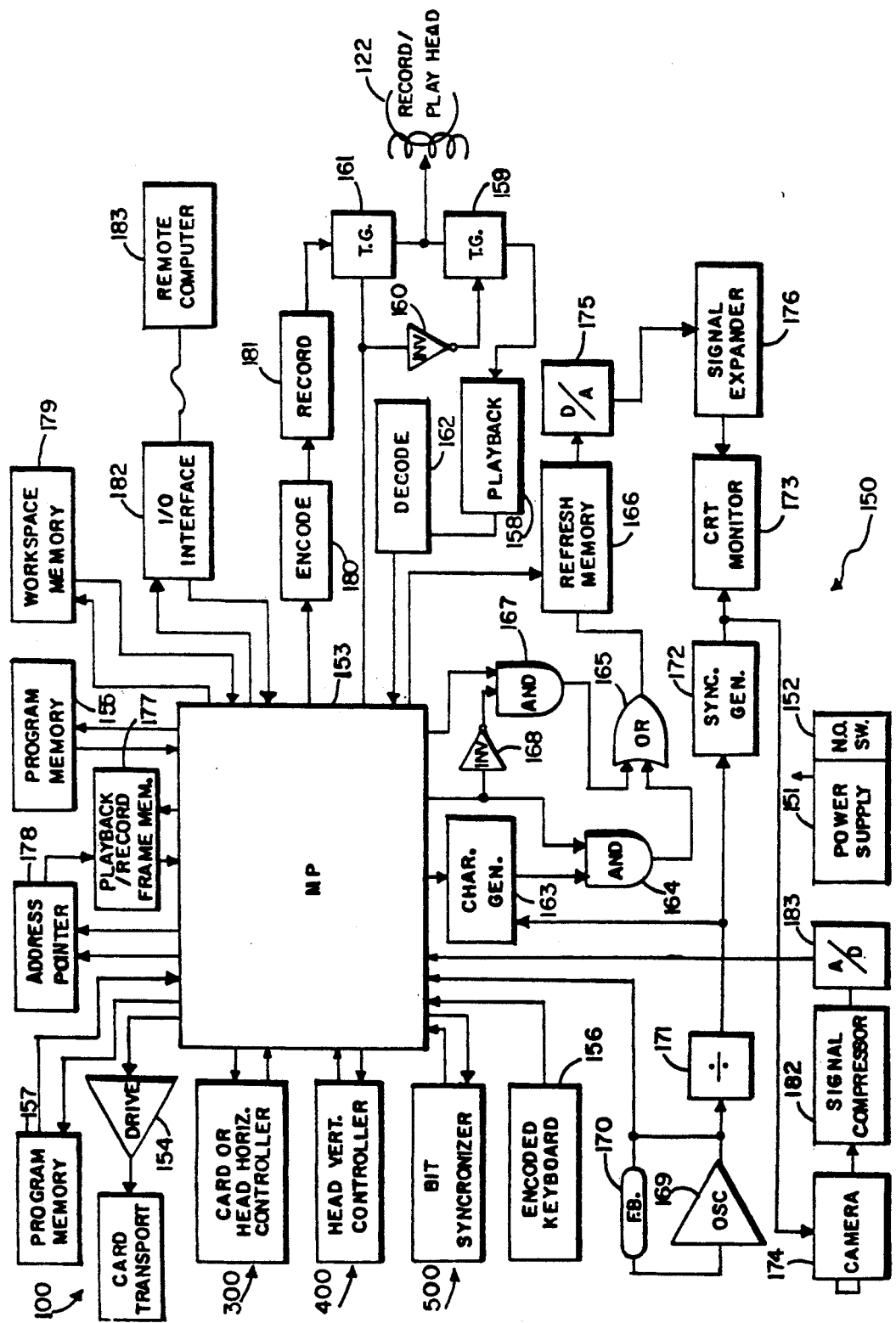
FIG. 7 is a schematic diagram of an electronic control system for controlling the transducing apparatus of FIGS. 1-5.

In FIG. 7 is shown details of an electronic control system denoted 150 for controlling an apparatus of the type illustrated in FIGS. 1-5 during operations of selectively reproducing frame signals or messages from selected frame recording locations of selected parallel tracks of a record card of the type illustrated in FIGS. 1-3.

In FIG. 7, it is assumed that one or more sources of suitable electrical energy are connected to the proper sides of all of the electrical devices and sub-systems to permit them to properly function as described, such source or sources being generally defined by notation 151.

Assuming that a record card 10 is properly aligned and located on the upper surface of the central portion of the transducing apparatus 100 of FIG. 5, and contains one or more digital or analog frame recordings provided on one or more tracks thereof, selective operation of the bridge crane and the carriage for the transducer mount as well as the transducer supported thereby, in order to effect the selective reproduction of a selected video frame signal or signals from the record member, may be effected by computer controlling the motors driving the bridge crane along the guides provided for such purposes in a direction which is normal to the direction of the parallel tracks 12 of the record member and also controlling operation of the motor driving the carriage along the bridge crane track. Such transducer transport control is effected by means of control signals which are generated and are controlled in their generation by means of a microelectronic computer or microprocessor 153 which is operated through a driver 154 according to instructions which are preprogrammed in its program memory 155, which may comprise a read-only-memory or ROM, or such program may be entered in such memory by means of an operator selectively operating the encoded keys of a keyboard 156. Also provided in FIG. 7 is a programmable memory 157 adapted to receive and store signals generated by the keyboard 156 or one or more remote signal generators to be described. Microprocessor 153 may comprise any general purpose microprocessor, such as the Intel 8086 microelectronic processor or similar digital signal electronic processor having the same or greater capacity.

Signals generated by the magnetic record-playback transducer or transducers 122 in scanning the selected recording are transferred to a playback or reproduction electronic circuit 158 through a transmission gate 159 which has been toggled by a signal from the control microprocessor 153 through an inverter 160. Such microprocessor generated signal simultaneously toggles a transmission gate 161 to an off-state so that the record playback transducer 122 is exclusively energized in the playback mode during a reading cycle. The output of the playback electronic circuit 158 is converted to digital signals which are representative of the information recorded on the record card 10, which information may consist of data representing digital characters and/or pixel color and brightness information which is passed to a decoder 162 from the playback electronic circuit 158, the output of which decoder extends to an input of the microprocessor 153. The microprocessor 153 transfers such video information through character signal generator 163 to one input of an AND gate 164, when a true signal for such character information is provided by the microprocessor 164 to the other input to the AND gate 164. The character or brightness signals are passed from the output of the AND gate 164 to one input of an OR gate 165, the output of which OR gate extends to a refresh memory or buffer 166 for storing such signals and providing them on an output thereof at a fixed frequency, when needed, to generate a still image display on a display screen of the video terminal, such as a cathode ray tube.

In the event that the information which is reproduced from the card is image information other than character information, such image information signals are passed through the microprocessor 153 to an AND gate 167 and therefrom through OR gate 165 to the refresh memory or buffer 166 and generated thirty times per second on the output thereof. In such mode of operation AND gate 164 is deactivated when it does not receive a true signal from the microprocessor or computer 153 and the second AND gate 167 is activated by such a true signal received from the microprocessor 153 and passed to an inverter 168 connected to a switching input of the AND gate 167.

Sequencing control of the microprocessor 153, including operational synchronization, is provided by means of a clock oscillator 169 having an attendant stable, accurate feedback electronic circuit 170. The output of oscillator 169 is passed to microprocessor 153 and is also input to a devider 171, the output of which is of a frequency and parameter suitable for synchronizing the operation of the video display 173 and a video camera 174 which may be employed to generate full-frame video picture signals for recording on the card. The output of devider 171 is also applied as a synchronization signal for controlling the operation of the character generator 163 and a sync signal generator 172. Sync generator 172 provides vertical and horizontal sync signals for controlling the operation of the display or cathode ray tube of the monitor 173. Memory 166 is scanned by signals received from the microprocessor 153 to provide output signals recorded therein at a fixed frequency, such as thirty times per second, which are converted to analog video signal form by a digital-to-analog converter 175, which analog signals are frequency and/or amplitude expanded by means of a signal expander 176 which is employed to compensate for signal compression which may have been employed during the recording of the reproduced information. The output of signal expander 176 is input to the monitor 173 as a repeating compatible full-frame video picture signal representative of either the frame of characters generated by the character generator 163 or defining color and intensity or luminescence information representing the image frame information stored in the memory 166.

It is noted that the operation of selectively reproducing a frame of video or display information from a selected track of a record card may be accomplished during movement of the reproduction transducer 122 in either direction with respect to a record track of a card or sheet record member 10. To accomplish this mode of operation during either forward or reverse travel of the transducer with respect to the record card, a recordable playback frame memory 177, such as an integrated circuit solid state memory, magnetic bubble memory or the like, is provided for receiving digital signals output by decoder 162 through the microprocessor 153 to be recorded sequentially at selected memory locations thereof as determined by an address pointer 178 such as an up-down counter. The direction of count, up or down, and the clocking of the count of the pointer 178 is under the control of the microprocessor 153. In the forward reading mode, the signals defining the frame of information, are first loaded into the memory 177 and recorded therein. Thereafter such frame signals are addressed and recorded in memory 166 in the manner previously described.

In the reverse reading mode, a memory 174M is similarly loaded or recorded but is addressed in descending memory position order wherein the reverse location order stored information is transferred by means of a microprocessor 153 to the memory 166 as previously described.

Also included in system 150 is a sub-system 300 which is employed to control the positioning of magnetic head 122 with respect to a selected track of the card 10. A sub-system 400, is employed to control the positioning of head 122 to align it with a selected track of the card 10 to permit it to thereafter reproduce information recorded along a selected portion of such selected track. A further sub-system 500 is employed to provide synchronization of the bit patterns reproduced from the selected recorded frame. All three sub-systems, 300, 400 and 500, are interactively controlled by means of the microcomputer or microprocessor 153.

During the mode of recording character information, such as alpha numeric information, on selected tracks of the card 10, appropriate command signals are generated and entered by means of selectively operating keys of keyboard 156, which generate code signals which are interpreted by the microprocessor 153 according to instructions provided in memories 155 and/or 157, so as to provide a sequence of operations, viz:

The desired alpha numeric data subsequently entered by means of selective operation of the keys of keyboard 156, is stored, in a work space memory 179. Such data is also transferred, by means of character generator 166, AND gate 164 and OR gate 165 to refresh-memory 166 and is thereafter displayed on the monitor 173 as indicated above during a reading sequence. This allows the operator of the system 150 to review such entered data and to make corrections interactively by means of keyboard 156 and microprocessor 153 as necessary. When the data is entered and verified, a further command entered on the keyboard 156 is employed to instruct the microprocessor 153 to transfer such data from the workpiece memory 179 to a record encoder 180. The encoded data output by the encoder 180 is an appropriately modulated digital recording provided along a selected portion of the card 10 by means of recording electronics 181. The output of a recording electronic circuit 181 is transferred to the record-playback head 122 by means of a transmission gate 161 and is subsequently recorded on a selected portion of a selected track of card 10. In such mode, the gate 161 has been toggled by means of a true record signal from the microprocessor 153.

For the recording of video frame information, a television camera 174 is provided, the output of which is applied to a signal compressor 182 so as to enhance recording signal-to-noise ratio or reduce bandwidth noise ratio. Such output is converted to digital form in an analog-to-digital converter and the digitized video signal output of the converter is passed through microprocessor 153 to a memory 179 and to a buffer or refresh memory 166 and, after passing through gate 165 or 167, applied to video monitor 173 to generate a display on the display screen thereof. When a complete frame has been composed, the operator selectively operates the keys of keyboard 156 to generate recording codes which are utilized thereafter to cause the microprocessor 153 to control the transfer of the contents of memory 179 to a record-encoder controller 180 which controls the apparatus to effect recording of the frame information signals on a selected portion of a selected track as described.

The recording of a video image or character information may also be effected during relative motion between the magnetic recording head 122 and a card in either direction. To effect such bidirectional recording operation, a memory 177 having an address sorter 178 is interposed in the data stream between the workspace memory 179 and a recording encoder 180 wherein said memory operates in the manner described above for effecting a message or frame signal reading operation in either direction.

Data stream "start" and "termination" codes are provided at the beginning and end of each frame or message recording and are composed so as to be indicative of whether the recorded information is image information derived, for example, from the output of a television camera or character information derived from a keyboard, computer or character reading apparatus. Such coded information may be added to the recorded data as signals derived from the microprocessor 153 which signals may be in the form of codes to be so recorded or control signals for controlling the encoder 180, to generate the proper recording signals. Thus, during the playback of information picked up from the selected portion of the selected track of a record card, the microprocessor 153 is operable to recognize such code signals in accordance with its programming and to provide control signals for controlling the operation of AND gates 164 and 167 to perform the functions described in effecting the generation of the desired video displays.

While only a single record-playback transducer is illustrated, a multiplicity of such transducers may be employed so as to increase the data transfer rate. Such function may be effected by replicating the circuit illustrated which includes transducer head 122, gates 161 and 159, inverter 160, recording electronics 181, playback electronics 158, decoder 162 and encoder 180. It is also noted that the recording and reproduction functions may be divided between respective recording and reproduction heads but, by employing a single head for effecting both functions, head alignment problems may be reduced.

An input-output interface 182 is also provided which permits interconnection of system 150 to a remote computer denoted 183. Thus character data or image information, derived from a television camera and reproduced from the record card by means of system 150, may be transmitted to computer 183. Conversely, data or video picture information stored in the computer 183 may be transmitted therefrom to be recorded on a record card by means of the recording elements of the system 150. Also, system 150 may interact with or be programmed by signals received from the remote computer 183.

Figure 8:
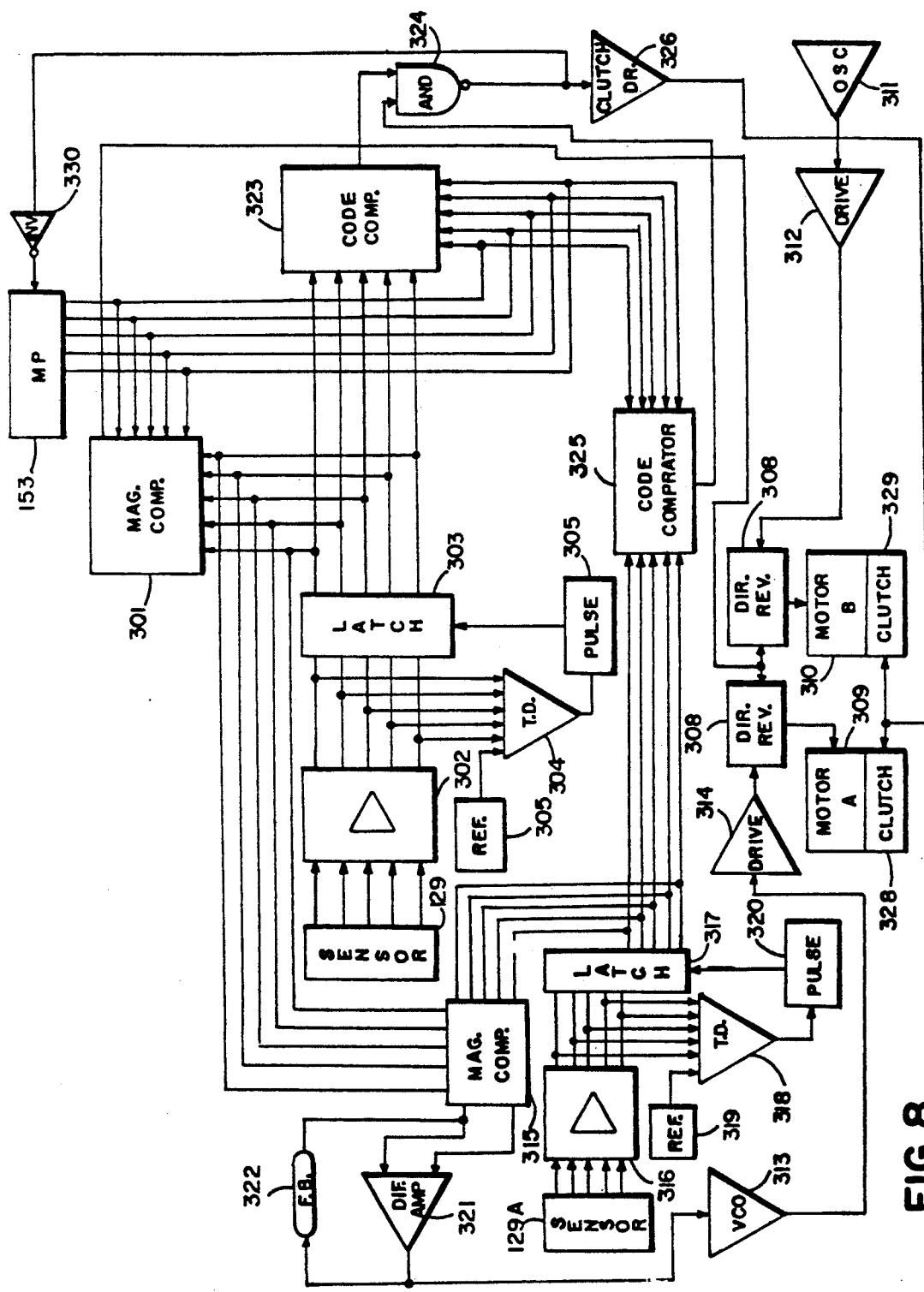
FIG. 8 is a schematic diagram of a subsystem for aligning a record card and transducing transport.

In FIG. 8 is shown electronic components of a subsystem 300 which is operable for selectively aligning a record card and one or more magnetic transducers utilizing an apparatus of the type illustrated in FIG. 5. A microprocessor 153 provides a code signal which is representative of a selected track or frame location and such code signal is applied to a digital magnitude comparator 301, such as a bit comparator, while a bank of electro-optical or magnetic sensors 129 reads the pre-recorded location defining track or tracks provided on the record card which is disposed on the support and converts such pre-recorded codes to electrical signals. Such electrical code signals are amplified in an amplifier 302, filtered thereby if necessary and output to a multi-bit latch 303 and also to a threshhold detector 304. When any input to the threshhold detector 304 exceeds a preset reference level which is set by a reference generator 305, detector 304 causes a pulse to be generated on the output of a pulse generator 306 which sets the outputs of latch 303 to the bit input pattern which is output by amplifier 302. Thus the set output of latch 303, which corresponds to the particular track or track location of the card 10 which is aligned with the transducer head 122, defines the code input to the magnitude comparator 301. If the track which is aligned with the transducer head is detected by the code scanning heads and determined to exceed the code of the selected track, comparator 301 outputs a control signal to motor directional reversal switches 307 and 308, which may comprise mechanically connected magnetic clutches, and which determine the direction of rotation of motors 309 and 310 which respectively operate drive rolls 135 and 135A which drive the card along the platform 132 beneath the bridge 115, effect positional alignment of the card on the platform and, in one mode of operation, X-directional alignment of the head 122 with the selected track of the card. Such motors 309 and 310 may comprise synchronous AC motors. Thus, suitable relative motion between the magnetic head and the card to attain alignment between the head and a selected track of the card, may be effected regardless of what relative positioning is effected between the head and the card prior to effecting such alignment.

Motor 310 derives operational power from a fixed frequency oscillator 311 through a motor driver 312 when a switch 308 is closed. Motor 309 derives operational power from a voltage controlled oscillator 313, having a quiescent frequency similar to that of oscillator 311. Thus both motors rotate at substantially the same speed. Card 10 is thus translated with respect to head 22 in the direction controlled by the comparator 301 until the selected track of a card is aligned with the head or the head is translated in such direction by movement of the bridge crane to effect such selective alignment.

As card 10 is moved relative to head 122, track parallelism may be maintained as follows:

At any instant the code signals output by the sensor banks 129 and 129A are simultaneously compared to determine if they simultaneously scan the same code recordings which are provided at the ends of each of the record tracks of the card and which, if they are the same, indicate that the card is properly aligned on the table with the parallel tracks thereof extending parallel to the axis along which the magnetic transducer supporting carriage of the bridge travels. In other words, the instant track position code sensed by the sensors of bank 129 and output by latch 303 are input to a digital magnitude comparator 315, simultaneously as the sensors of bank 129A sense the track position codes along the opposite code recording track of the card. Such latter codes are amplified and filtered by a multi-channel sense amplifier 316 having outputs which extend to a multi-bit latch 317 and to a threshhold detector 318. When any input of detector 318 exceeds a preset level which is generated by a reference generator 319, such detector 318 conveys a set pulse through a pulse generator 320 to latch 317 transferring the sensed track code to the output of said latch, the output of which extends to the other inputs of the magnitude comparator 315 which provides a digital differential signal which is indicative of the relative magnitudes of the codes sensed by the sensors of the sensing banks 129 and 129A, which signals are transmitted to a differential amplifier 321. The amplifier 321 provides an output which is indicative of the magnitude of the difference between the codes output by the sensor banks 129 and 129A. A negative feedback circuit 322 is provided in circuit with the amplifier 321 and contains a sufficiently long time constant to prevent oscillations about an equilibrium state. The output of amplifier 32 is applied to control the precise frequency of a voltage controlled oscillator 313. Thus, by varying the frequency of voltage controlled oscillator 313, a precise control is effected of the drive speed of motor 309 and such speed may be relatively controlled with respect to the speed of motor 310, which is fixed, thereby providing precise control of the parallelism between the parallel tracks of the card 10 and the bridge crane guide for the carriage supporting the magnetic transducer head or heads 122.

When the card 10 is properly aligned on its support and the selected track position code output by the micrprocessor 153 is similar to that output by the latch 303 defining coincidence in the code comparator 323, such comparator will pass a true output indicating signal to one input of a NAND gate 324. Simultaneously, if parallelism exists as indicated above, the code generated by the microprocessor 153 will match the code output from latch 317 at code comparator 325 and such latter comparator will output a true signal to the other input of NAND gate 324. When both inputs to gate 324 are true, the output of gate 324 is false, thus providing a false indicating signal to a clutch driver 326 for the clutches of motors 309 and 310 which are disengaged from their output shafts. Such clutches 328 and 329 thereby effect a braking action effecting predetermined alignment of the carriage track with the parallel tracks of the card defining parallelism which allows transducing to be effected along the selected track of the card as described.

In FIG. 9, an electronic control system 300 is illustrated for controlling the polar coordinate electromechanical card transducing arrangement illustrated in FIG. 6. A code indicative of the selected circular track of the card is generated and output by microprocessor 153 to one input of a digital magnitude comparator 350. Simultaneously, sensors of a bank 351 sense prerecorded track indicating codes provided along one or more radial tracks of the card 10A as the carriage containing the recording and reproduction transducers is moved outwardly or inwardly in a radial direction parallel to such code track and the sensors thereof sensing such track codes generate output signals which are amplified and filtered by an amplifier 352 and are conducted therefrom to magnitude comparator 350. The relative magnitudes of the codes generated defining the selected track and the track which is being sensed are compared in the comparator 350 and, when coincidence occurs between such input codes, an appropriate control signal is generated which is output to a direction control switch 353, such as a polarity reversing relay, to effect the proper rotational operation of drive motor 264 which is operable to extend or retract the radial arm 265 on which the heads 269 and 270 are supported and to drive said heads radially with respect to the circular, concentric tracks of the card 10A. Motor 264 derives its operational power from a driver 354 which continues to drive such motor until the selected track location is attained by the magnetic transducing head or heads as indicated by the output of the code comparator 355 which outputs a true signal indicative of such code matching or coincidence, to an inverter 356 which is connected to operate an electro-mechanical clutch 357 which operates to disengage the drive shaft of motor 264 from the drive mechanism for arm 265 terminating the radial scanning movement of arm 265 per se or in cooperation with a positive action brake to insure a true stoppage of the arm 265 to position the head or heads supported therewith or thereby in alignment with the selected circular track. The true signal output by comparator 355 is also passed to microprocessor 153 and acts as a flag indicative that the selected track has been attained and the arm supported transducer is aligned therewith. Such flag signal is also utilized by the microprocessor 153 to cause the latter to generate control signals which are applied to a motor driver 358 and a direction reversal switch 359. The motor driver 358 then drives motor 263 to pivotally rotate the arm 265 in a selected direction to cause the transducer heads 269 and 270 to scan the selected track and to record on or reproduce therefrom.

The direction reversal switch 359, when operated by a signal generated by the microprocessor 153, effects reverse driving of the motor 263 to return the arm 265 to a position in which the transducing heads 269 and 270 are aligned with the radial code track of the card.

In FIG. 10 is shown constructional details of a control track scanning transducer such as a magnetic or light sensitive pickup or a bank of such sensors which scan frame signals or messages provided on the selected track of a card, such subsystem being denoted 500. The positional control track or tracks contain prerecorded magnetic or electro-optically sensitive codes provided along border portions of a card, such as illustrated in FIG. 1, or between selected tracks of the card. A similar code may also be recorded along a code strip attached to or forming part of the pivotted arm 265, for use in the apparatus of FIG. 6 or the trackway defined by the bridge 127 provided as part of the bridge crane of FIG. 5. The transducer or bank of transducers 575 scan and read signal recordings along the control track and the output thereof is amplified and filtered by a sense-amplifier 576 and made digitally compatible by means of a threshhold detector 570. The output of the detector 570 is a control signal which is passed to the microprocessor 153 and functions to synchronize the reading of data from the card 10 or card 10A.

In FIG. 11, an alternative construction of a control track reading apparatus is shown which provides positional feedback signals to calibrate the signals derived from the control tracks provided along the arm 265 or the bridge 115 with the signals generated in reading the tracks of the card. A sensor 575, amplifier 576 and threshhold detector 577 function as described in the description of FIG. 10. Microprocessor 153 initially provides a drive signal to the position motor 578 through a differential motor drive 579. Motor 578 then mechanically adjusts the relative position of the sensor 575 with respect to the control track until suitable coincidence is achieved between the sensor 575 and the control track recorders. Once such coincidence is achieved, microprocessor 153 removes its control signal applied to driver 579 and thereby stops the operation of motor 578 so as to define the calibrated position.

In FIG. 12, details of sub-system 400 which is utilized to determine the vertical positions of the record-playback heads 122, 123 or 269, 270 under the control the microprocessor 153. Light from a light source 401, such as a light emitting diode, is conducted along a fiber optic light pipe 402 which is supported by and terminates on the underside of a mounting block 403. Block 403 is attached to the amount or support 121 for the transducer. Affixed to the end of the light pipe 402 is a short focal length lens 402A, which lens may be a molded portion of the fiber 402. Also supported by block 403 are three additional light pipes 404, 405 and 406 which are linearly arranged as shown and protrude through the block 403. Light pipes 404, 405 and 406 each conduct light from their fields to respective photoelectric detectors, such as phototransistors, denoted 407, 408 and 409.

During operation, microprocessor 153, after establishing proper head-to-card relative horizontal positioning, in the manner previously described, toggles a bi-directional switch 410 to allow a differential amplifier solenoid driver 411 to provide drive signals for solenoid 124 which solenoid begins to advance the head assembly 121 toward the card 10.

Initially, the distance between block 403 and the card 10 is relatively great and the area of the card 10 illuminated by light passing through lens 402A is reflected to fibers 404 and 405. As the distance between block 403 and the card 10 decreases the area being illuminated by such light shrinks in size as focus is approached and eventually is confined to an area scanned only by fibers 405 and 406. The physical arrangement is such that, when a predetermined scanning height or distance is achieved, the illuninated area is in perfect focus and directly beneath fiber 405 to the exclusion of areas scanned by fibers 404 and 406.

The outputs of photosensors 407, 408 and 409 are respectively amplified by sense amplifiers 412, 413 and 414. The output of amplifiers 412 and 413 extend to the inputs of an AND gate 415 the output of which drives a non-inverting input of a differential amplifier 411 which is operable to control the advancement of the shaft of solenoid 124 by providing an increasing bias signal to such solenoid through a switch 410. If the distance between the card 10 and the block 403 becomes too small, amplifiers 413 and 414 will have true outputs since the illuminated area of the card will increase in size due to defocusing therefor light will be received by optical fibers 405 and 406 but not by optical fiber 404. Thus both inputs to AND gate 416 will be true and the signal output thereby will drive the inverting input to amplifier 411 which will then decrease the bias on the solenoid 124 through switch 410. A negative feedback circuit 417 is also provided and is connected to the differential amplifier 411 which has a time constant of sufficient duration so as to prevent oscillation of the shaft of the solenoid 124.

When the predetermined scanning height is achieved, only amplifier 413 has a true output while amplifiers 412 and 414 have false outputs and a NOR gate 417 has a true output which output forms one input to an AND gate 419. The other input to AND gate 419 is derived from the true output of amplifier 413. When both inputs to AND gate 413 are true [eg. when the head is positioned correctly] gate 419 sends a signal to the microprocessor 153 which is indicative of such condition and thereby allows the microprocessor 152 to continue its sequential control as previously described.

System 400 is protected, in the event that lamp 401 fails, from causing the head assembly to crash against the card 10 by means of the deactivation of both AND gates 415 and 416, which deactivation effectively deactivates amplifier 411 and terminates the bias on solenoid 124.

In addition to providing suitable sources of electrical energy on the proper sides of the electrical devices and subsystems described herein, it is assume that suitable input-output bus decoding circuitry is also provided, where necessary, to effect proper interfacing of the devices and subsystems which interface with the microprocessor 153.

Additional forms of the instant invention are noted as follows:

1. A record member such as a magnetic record card of the type described, disc, drum or tape may have one surface thereof coated with a polymer which is sensitive to ultraviolet light either when developed or in undeveloped portions thereof, wherein such developed or undeveloped portions of the coating film are developed or contain digital code recordings of binary codes which indicate either or both the nature of the primary information they are recorded over or adjacent to, or track and frame locations as described or both. Ultraviolet light is employed as the source 41L to flood the code strip(s) disposed along or adjacent the tracks 12 of FIGS. 1 and 3 or directly above each record track of the record card and the photodetector or detectors supported adjacent or in direct alignment with the transducer tip 45 or forming part of said tip may be employed to scan and detect such ultraviolet sensitive recordings and generated output signals which are used to precisely position the transducer with respect to the selected track or information recorded on the card, 2. The tracks 12 may contain primary information such as document or video picture signals recorded in the form of micro-pits, cavities or protrusions 0.6 to 1.0 or more microns wide and 0.2 to 1.0 or greater deep as described above and embossed or beam recorded along such tracks wherein the pits are either provided in a laminate structure of such ultraviolet sensitive film coating a suitable thermoplastic base of the type employed in videodiscs or the entire record member or recording layer is made of such ultraviolet sensitive material as described in U.S. Pat. No. 4,308,327 for example, and such ultraviolet material may contain digital code recordings of either or both location and information indicating signals or certain primary information signals per se along with signals indication same or its grid location. Such recordings may be effected between and/or over the cavity recordings or adjacent thereto.

3. The code strip areas 17-20 of the magnetic card 10 may be formed with parallel codes or track marker location indicia when the card or record member is formed prior to the recording of primary information, such as full-frame video picture or character signals, on the primary information tracks 12. Such codes may be formed by means of a die or mold embossing or molding same in the surface stratum of the card or record member or by means of a computer controlled and deflection controlled laser or electron beam or beams intersecting the code strip tracks or areas while the card or sheet 10 is in motion or stationary. The recordings may be microcavities or pits.

4. The code strip areas 17-20 may also be provided as magnetic recordings of parallel codes or location marker signal recordings by magnetically transfering such recordings from a master sheet, plate or drum in contact with the record member 10 during such transfer and recording. Such magnetic transfer of code recordings may be effected while the record member 10 and master are stationary or in relative moving contact such as by driving the two between compression rollers or providing the master as a magnetic drum containing such recordings around its periferal surface.

5. The card 10 may be edge coded for automatic and rapid scanning to attain acces from a stacked array of such cards by die-cutting a selected edge or edges of the card with notches, the lengeth, number and spacings of which determine codes which may be photo-optically scanned with a photodetector or bank of such detectors or magnetically detected by one or more magnetic heads scanning the edges of cards in a stack. One or more edges of a card may also be embossed or otherwise formed with the described microcavities or microprotrusions formed as parallel codes capable of being scanned and detected by photoelectric or magnetic transducers forming part of an automatic card retrieval system in which cards containing video frame signals recorded along tracks thereof may be accessed automatically and either automatically or manually fed to card reading apparatus of the types shown in the drawings to attain either or both reproduction or recording access to selected portions of selected record tracks as described herein.

6. The card retaining and prepositioning platforms of FIGS. 3, 5, and 6 may have their central portions recessed while the lateral edges of a card are gripped to maintain the card fixed and predeterminately positioned thereon to permit the central portion of each card, such as track containing area 11, to deflect when a transducer is brought thereagainst and prevent damage to head and card due to head crashing if it should occur. A deflectable resilient rubber pad may also be supported beneath the central portion 11 of each card and attached to the platform or table in a rectangular recess therein to permit yieldable deflection of the center of each card to the force of a transducer when it engages the card while the longitudinal border portions of the card are held by wheel or gripper means which engages the card once it is properly aligned on the table or platform.

7. The record tracks 12 of the record card 10 may also contain microcavities or pits embossed to formed therein with a pulsed laser beam and defining frames of video information which is digitally recorded along such tracks in tandem array as described and adapted to be read by photo-optical and laser beam means to generate frame video signals which may be employed as described to generated frames of video picture information on a video display such as a cathoderay tube. In other words, the recording and/or reproduction transducers of FIGS. 3, 5 and 6 may also comprise one or more lasers and/or photoelectric cells which are caused to become energized when they scan past selected portions of selected tracks of a card when the transducers are transported as described to and along the selected tracks of a card.

8. The magnetic record card 10 may be manually or automatically wrapped around and made to conform completely or partly to a cylindrical support to define an arcuate or cylindrically shaped record member containing circular or semi-circular record tracks which may be scanned by one or more transducers while either the cylindrical support is rotated to rotate the circular record tracks past the transducer(s) which may be longitudinally driven within or exterior of the cylindrical support to locat the magnetic head or transducer(s) in alignment with selected record tracks, or whil the cynlindrical support is maintained stationary and the transducer(s) is rotated on an arm within or exterior of the cylindrically deformed card to scan selected circular tracks thereof. It is noted that either the cylindrical support for the card or the rotatable support for the transducer(s) may be driven axially and controlled in such axial movement to position the transducer scanning recorded frame information into alignment with the track of the card containing such selected frame or frame location. Such controlled longitudinal positioning of the transducer and the card may be effected by a bank of photoelectric detectors which are supported by the shaft supporting the transducer scanning the record tracks 12 but not rotatable with said shaft, wherein such transducers are operable to scan the codes of either of the tracks 19 or 20 to provide feedback signals for activating the rotating transducer while it is aligned with a selected track of the card to record on and/or reproduce from such selected track or a portion thereof containing or defining a selected video frame of the type described. In another form of the invention track selection and transducer positioning may be effected by feedback marker signals generated in scanning marker recordings provided along the shaft supporting the transducer(s) which reads the information tracks 12.

9. The hereinbefore described apparatus which is illustrated in the drawings and the modifications thereto described above may be still further modified to effect magnetic recordings on and reproductions from other forms of record members such as other forms of magnetic cards, magnetic discs or tapes which contain electro-optical code recordings of types described, which are electro-optically scannable by means as described and illustrated, for example, in FIGS. 3, 5, 5A, 6 and 9-12. Such electro-optically scannable code recordings may be prerecorded by molding microcavities defining same in select portions of the magnetic card, disc or tape adjacent to and/or in alignment with select single or groups of (parallel) magnetic recording tracks of the card, disc or tape as described, to indicate, when electro-optically scanned and reproduced by scanning means including one or more lasers and one or more photoelectric detectors, the precide locations of select record tracks of the magnetic tape, disc or card and, in certain instances, the precise locations of select portions of each magnetic record track along which locations select digital and/or analog data may be recorded and selectively reproduced therefrom by magnetic transducing means of the types described and illustrated in the drawings. In other words, such electro-optically scannable code recordings may be provided in one or more formats including (a) along a line or track which is normal to a magnetic record track or a group of parallel record tracks of the tape, disc or card to indicate the precise location of data recorded longitudinally along such magnetic track or tracks, (b) along a single record track which extends parallel to and at the side of one or more parallel magnetic record tracks of the tape, disc or card, (c) along a single line or track extending parallel to and immediately above a magnetic record track containing, or adapted to have magnetically recorded therealong primary information such as data for use by a computer or (d) along a plurality of parallel lines or tracks extending immediately above and parallel to one or more magnetic record tracks. In the latter two record structures, the code defining cavities or pits may be compression or injection molded in either a layer of magnetic recording material composed of magnetic particles of ferrite or chromium dioxide in a binder of suitable formable plastic resin or in a thin film of such resin coated above a magnetic recording material defining the tape, disc or card or a coating thereon. Such electro-optically scannable cavities or codes may be so recorded at very high density as to permit the precise location and scanning of primary data on one or more magnetic record tracks adjacent thereto wherein such primary data may be more closely recorded along parallel record tracks which are closer to each other than the record tracks of conventional magnetic tape and discs, such as flexible magnetic discs. Recording density may be extended to an even great degree when certain or all of the electro-optically scannable data and track locating codes are recorded in a layer directly above the magnetic recording layer containing the primary data recordings providing space for a greater number of magnetic recording tracks along the space of the record member which would ordinarily be required to accomodate the electro-optically scannable code recordings. In order to permit magnetic recordings to be made and detected beneath the plastic layer defining the recording arrangements of (c) and (d) above, such layer will preferably be less than 0.0005" in thickness. While the tape, disc or card substrates may comprise flexible or rigid plastic materials, such as employed in conventional flexible magnetic tape or flexible magnetic recording discs, they may also comprise a thin sheet of magnetically recordable metal alloy or ceramic material.

If the data frame indicating markers or microcavity defining codes are formed in the outer layer of a magnetic recording material coated on a card, disc or tape substrate, they may also be detected by a magnetic pickup or a bank of magnetic reproduction transducers riding thereagainst if all domains of the magnetic recording layer immediately adjacent the cavities or pits are in alignment to permit the head or heads to generate an output signal which varies when a cavity or cavities are scanned thereby, wherein such variations may be detected by electronic circuit means.

The following United States patents relating to magnetic and electro-optical recording and reproduction systems are made of record:

U.S. Pat. No. 3,434,130—Record Card Scanning Apparatus

U.S. Pat. No. Re.: 31,239—Information Storage System

U.S. Pat. No. 3,646,258 Computing Apparatus

U.S. Pat. No. 3,803,350—Record Card Scanning Apparatus

U.S. Pat. No. 3,818,500—Card Transducing Apparatus & Method

U.S. Pat. No. 3,943,563—System and Method for Recording and Reproducing Video Information on a Card, U.S. Pat. No. 4,121,249—Card Recording and Reproduction Apparatus and Method U.S. Pat. No. 4,212,037—Method for Scanning a Card with a Video Signal U.S. Pat. No. 4,084,198—Card Scanning Video System U.S. Pat. No. 4,040,097—Magnetic Card Reader with Movable Magnetic Head U.S. Pat. No. 2,743,317—Magnetic Recording Machine

What is claimed is:

1. Magnetic recording apparatus comprising in combination:
   a) a first support,
   b) a second support movably supported on said first support,
   c) guide means supported by said first support for guiding said second support in movement thereon,
   d) first motor means operable for effecting driving movement of said second support on said first support,
   e) magnetic reproduction transducing means mounted on said second support to be carried therewith as said second support is driven with respect to said first support,
   f) means supported by said first support for retaining, guiding and driving a magnetic record member adjacent and operably past said magnetic transducing means, which magnetic record member contains first track means having magnetic recordings of data defining information to be selectively reproduced by said magnetic reproduction transducing means from said record member and second track means defining electro-optically scannable indicia predeterminaly located with respect to said first track means,
   g) electro-optical scanning means supported by said second support and operable to scan said record member and detect said electro-optically scannable indicia as said second support is driven on said first support across said record member when it is operably supported adjacent thereto, whereby said electro-optical scanning means is operable to generate indicia detection signals,
   h) computing electronic circuit means for receiving and processing said detection signals and generating control signals,
   i) means for employing said control signals as tracking signals and applying same to cause said magnetic transducing means to scan select data recorded on said first track means of said magnetic record member and generate select electrical signals, modulated with select information, on an output, and
   j) means for receiving and recording select electrical signals generated by said magnetic reproduction transducing means when it scans select magnetic recordings along select portions of said first magnetic track means of said magnetic record member.

2. An apparatus in accordance with claim 1 wherein said electro-optical scanning means is fixedly located immediately adjacent said magnetic reproduction transducing means on said second support.

3. An apparatus in accordance with claim 1 wherein said electro-optical scanning means comprises a laser and a photoelectric detection means disposed on said second support to receive reflections of the light of said laser from the surface of a record member retained by said means supported by said first support.

4. An apparatus in accordance with claim 3 whereby said laser is located immediately adjacent said magnetic reproduction transducer and is operable to generate and project a narrow beams of light to intersect an area of a record member which is operably supported to permit magnetic recordings thereon to be reproduced by said magnetic reproduction transducing means, which area intersected by said narrow light beam is immediately adjacent a corrsponding area of said record member containing a select magnetic recording.

5. An apparatus in accordance with claim 1 wherein said second support is an arm which is pivotally supported on said first support for moving said magnetic reproduction transducing means and said electro-optical scanning means across a record member which is operatively located and supported above said first support.

6. An apparatus in accordance with claim 1 wherein said record member comprises a record card and said guiding means is operable to guide said record card along a select path above said first support.

7. An apparatus in accordance with claim 1 wherein said record member comprises a record disc rotated by said driving means on said first support adjacent said magnetic reproduction transducing means for operably presenting different portions of said magnetic recordings on said first track means to said magnetic reproduction transducing means to permit said transducing means to scan and generate electrical signals of select information magnetically recorded on said first track means and to simultaneously permit said electro-optical scanning means to scan and generate electrical signals of select electro-optically scannable indicia for use by said computing electronic circuit means for tracking and controlling the reproduction of said select information from select portions of said first track means.

8. An apparatus in accordance with claim 1 wherein said electro-optical scanning means includes a plurality of photoelectric detectors.

9. An apparatus in accordance with claim 1 wherein said electro-optical scanning means is operable to detect electro-optical scanning indicia indicative, when detected, that said magnetic reproduction transducing means is operably aligned with at least a portion of said first track means containing select data magnetically recorded thereon.

10. An apparatus in accordance with claim 1 operable to scan and reproduce information from a record member containing a multitude of parallel magnetic record tracks and corresponding electro-optically scannable indicia aligned with each of said magnetic record tracks.

* * * * *